US011939731B2

(12) United States Patent
Muders

(10) Patent No.: US 11,939,731 B2
(45) Date of Patent: Mar. 26, 2024

(54) SELF-PROPELLED GROUND MILLING MACHINE

(71) Applicant: BOMAG GMBH, Boppard (DE)

(72) Inventor: Nils Muders, Boppard (DE)

(73) Assignee: BOMAG GMBH, Boppard (DE)

( * ) Notice: Subject to any disclaimer, the term of this patent is extended or adjusted under 35 U.S.C. 154(b) by 55 days.

(21) Appl. No.: 17/657,963

(22) Filed: Apr. 5, 2022

(65) Prior Publication Data

US 2022/0316155 A1 Oct. 6, 2022

(30) Foreign Application Priority Data

Apr. 6, 2021 (DE) ..................... 10 2021 001 760.9
Jul. 20, 2021 (DE) ..................... 10 2021 118 786.9

(51) Int. Cl.

| | |
|---|---|
| ***E01C 23/088*** | (2006.01) |
| ***E01C 23/06*** | (2006.01) |
| ***E01C 23/12*** | (2006.01) |
| ***F01P 3/18*** | (2006.01) |
| ***F01P 7/02*** | (2006.01) |
| ***F01P 11/10*** | (2006.01) |
| ***F15B 21/042*** | (2019.01) |
| *F01P 5/02* | (2006.01) |

(52) U.S. Cl.

CPC .......... *E01C 23/088* (2013.01); *E01C 23/065* (2013.01); *E01C 23/12* (2013.01); *F01P 3/18* (2013.01); *F01P 7/02* (2013.01); *F01P 11/10* (2013.01); *F15B 21/042* (2013.01); *F01P 2003/185* (2013.01); *F01P 2005/025* (2013.01)

(58) Field of Classification Search

CPC .................. E01C 23/065; E01C 23/08; E01C 23/085–0885; E01C 23/12; E01C 23/122–127; E01C 23/06–128; F01P 7/02; F01P 11/10; F01P 2005/025; F15B 21/042

See application file for complete search history.

(56) References Cited

U.S. PATENT DOCUMENTS

| | | | | |
|---|---|---|---|---|
| 9,631,342 | B2 * | 4/2017 | Kamimae | F01N 3/021 |
| 2008/0152428 | A1 | 6/2008 | Berning et al. | |
| 2008/0203684 | A1 | 8/2008 | Berning et al. | |
| 2009/0095441 | A1 * | 4/2009 | Masunoya | E02F 9/0883 165/41 |
| 2010/0109422 | A1 | 5/2010 | Busley et al. | |
| 2015/0361866 | A1 | 12/2015 | Baldus et al. | |

(Continued)

FOREIGN PATENT DOCUMENTS

| | | |
|---|---|---|
| CN | 2620719 | 6/2004 |
| CN | 108677670 | 10/2018 |

(Continued)

*Primary Examiner* — Hung Q Nguyen
*Assistant Examiner* — Mark L. Greene
(74) *Attorney, Agent, or Firm* — Grossman, Tucker, Perreault & Pfleger, PLLC

(57) ABSTRACT

The invention relates to a self-propelled ground milling machine, in particular a road cold milling machine, stabilizer or recycler, comprising a milling device for milling the ground at a milling depth, a machine frame supported by front and rear travel units, an internal combustion engine arranged in an engine compartment, a hydraulic system with at least two hydraulic pumps, a pump transfer gear and a hydraulic tank, and an operator platform.

20 Claims, 2 Drawing Sheets

(56) References Cited

U.S. PATENT DOCUMENTS

| | | | | |
|---|---|---|---|---|
| 2016/0177522 | A1 | 6/2016 | Nacke et al. | |
| 2021/0016661 | A1* | 1/2021 | Wagner | E01C 23/088 |
| 2022/0316333 | A1* | 10/2022 | Muders | E21C 25/10 |

FOREIGN PATENT DOCUMENTS

| | | | | |
|---|---|---|---|---|
| CN | 211689805 | | | 10/2020 |
| DE | 102005044211 | | | 3/2007 |
| DE | 102006062129 | | | 7/2008 |
| DE | 102012022732 | | | 5/2014 |
| DE | 102013021919 | | | 6/2015 |
| DE | 102014008749 | | | 12/2015 |
| DE | 102014011195 | | | 1/2016 |
| DE | 102014019168 | | | 6/2016 |
| EP | 1855899 | | | 9/2013 |
| JP | 2000314151 | A | * | 11/2000 |

* cited by examiner

Fig. 1
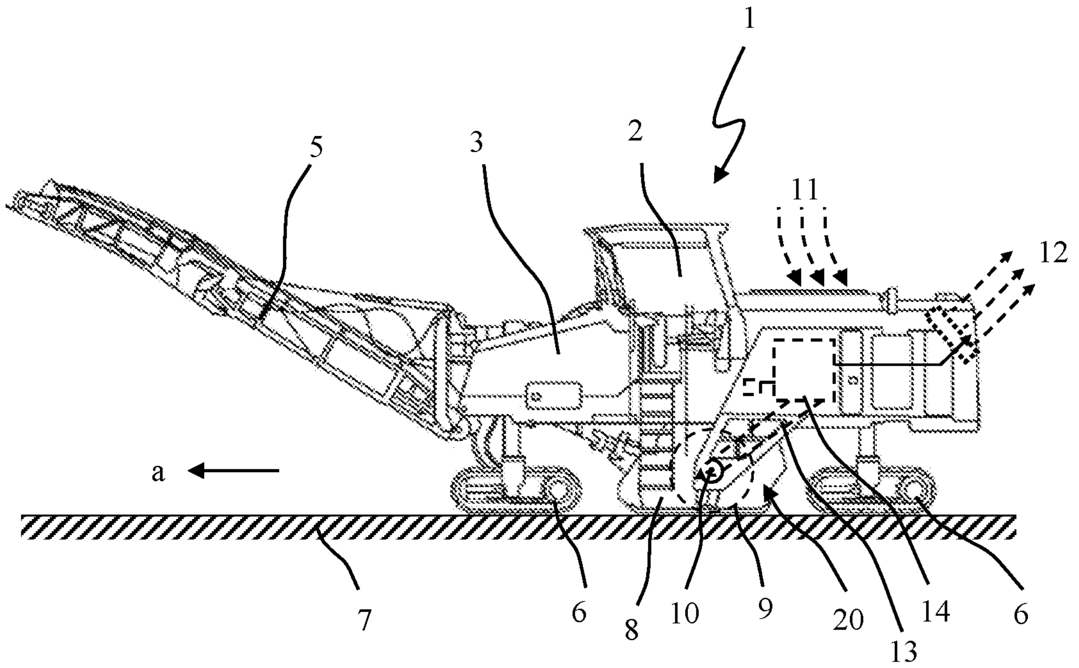
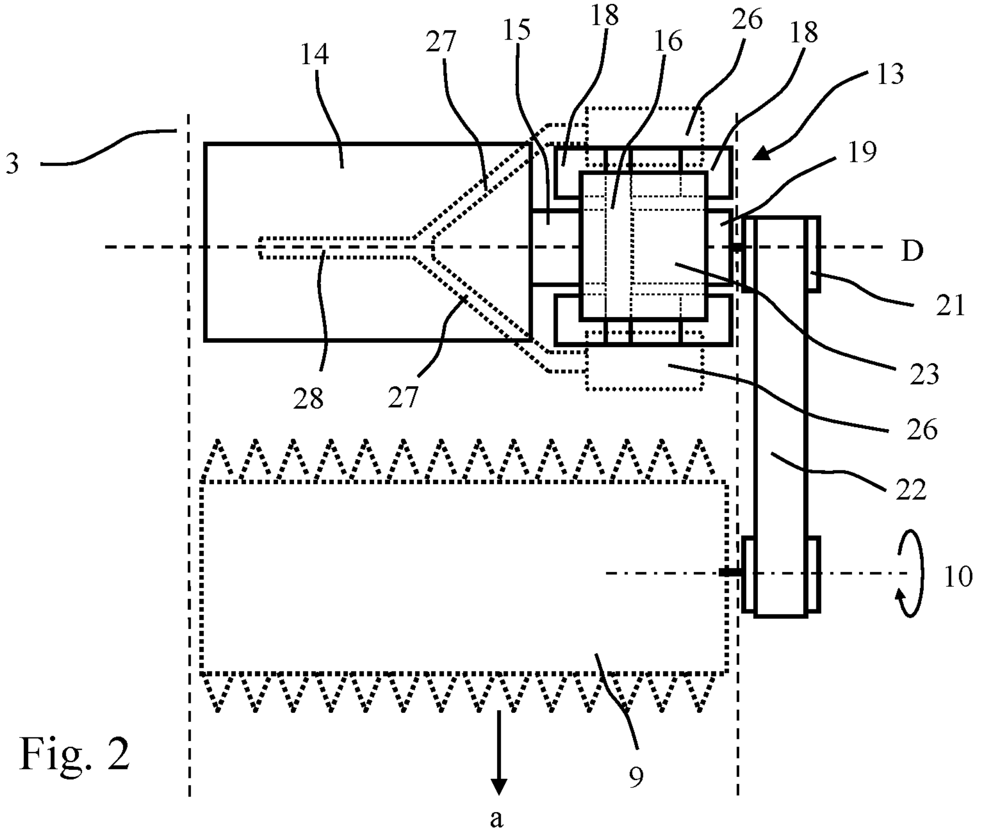
Fig. 2

Fig. 3
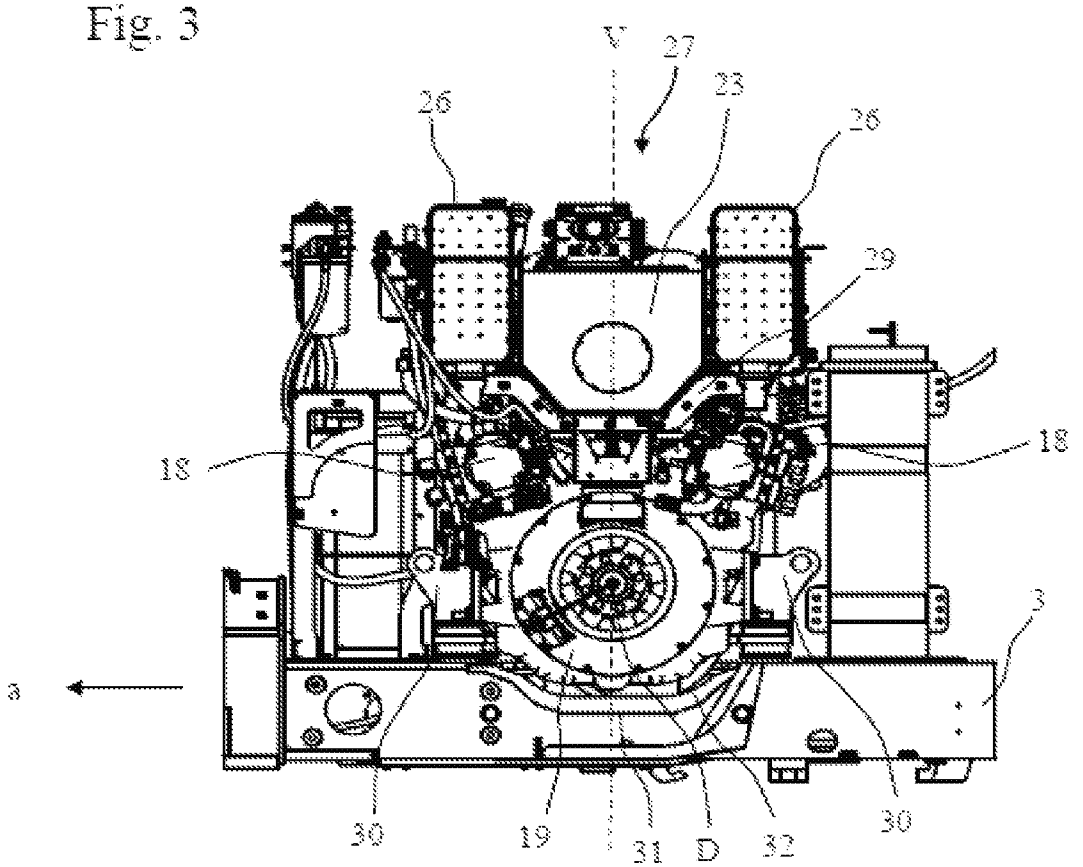
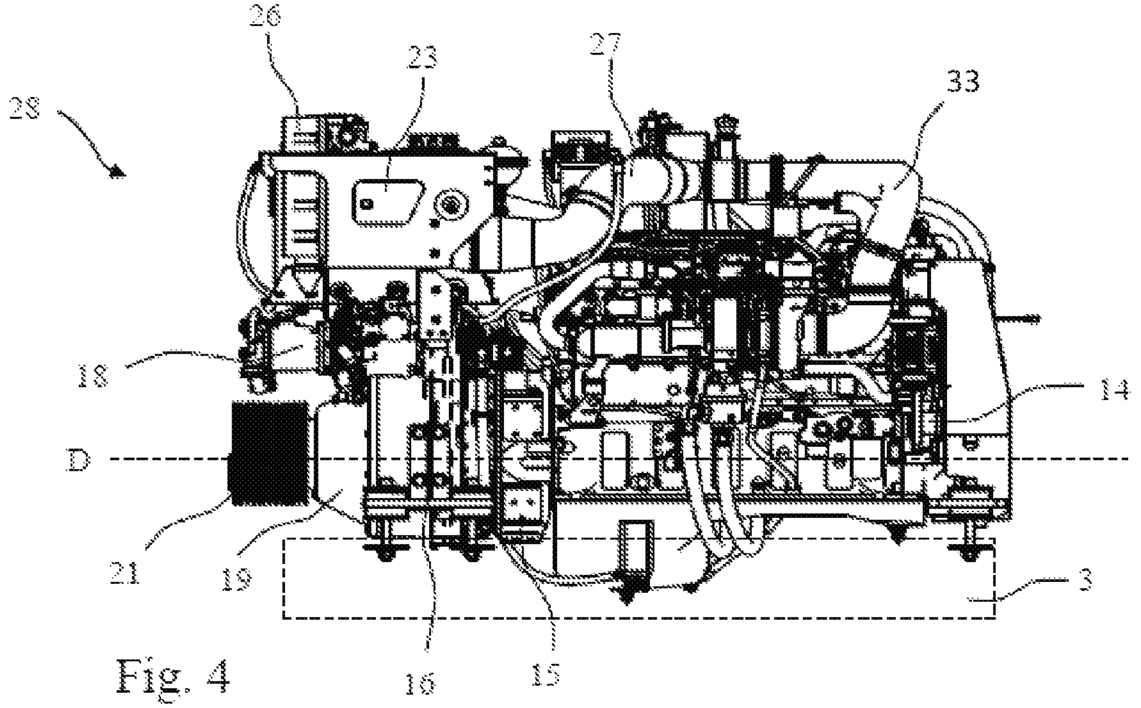
Fig. 4

SELF-PROPELLED GROUND MILLING MACHINE

FIELD

The invention relates to a self-propelled ground milling machine, in particular a road cold milling machine, a stabilizer or a recycler.

BACKGROUND

Generic ground milling machines, in particular road cold milling machines, stabilizers or recyclers, are known, for example, from DE102014008749A1, DE102006062129A1, DE102005044211A1, EP1855899B1 and DE102014019168A1. Such ground milling machines are often used in road and pathway construction and for subsoil stabilization. Its working device is typically a milling device with, for example, a hollow-cylindrical milling drum, which is equipped with a plurality of milling tools on its outer circumferential surface. The milling drum is arranged inside a milling drum box which is open toward the ground. During working operation of the ground milling machine, the milling drum is set in rotation, usually about a horizontal rotation axis running transversely to the forward direction of the ground milling machine, and is lowered into the ground until a desired milling depth is reached. The ground milling machine then moves in the forward or working direction while continuing to mill ground material. This breaks up and crushes the ground to be processed or, for example an asphalt surface of a road to be processed. The milled material produced in this process is conveyed, for example, via a discharge conveyor either in or against the working direction of the ground milling machine onto a transport vehicle and transported away by the latter.

In terms of its basic structure, the ground milling machine usually comprises a machine frame, which constitutes the essential support structure of the ground milling machine. Furthermore, one or more front and rear travel units are provided, which may be connected to the machine frame via lifting devices, in particular lifting columns. All travel units may be connected to the machine frame via lifting devices. An operator platform, which is usually arranged above the milling device, is provided for operating the ground milling machine.

Such a self-propelled ground milling machine is driven in particular by a primary drive unit, in particular a diesel combustion engine. In addition to a drive train for the milling drum, said combustion engine often drives numerous other consumers, such as one or more hydraulic pumps for supplying hydraulic actuators, such as in particular travel motors, actuators for, for example, lateral shields, a stripping plate, a hold-down device, a drive motor for a conveyor belt, a steering actuator, actuators for positioning a conveyor belt, lifting devices connecting the machine frame to travel units, etc. It is known to arrange several hydraulic pumps on a pump transfer gear in ground milling machines. The pump transfer gear often connects to the crankshaft of the primary drive unit, for example with the interposition of a clutch. Furthermore, it is known to arrange a shifting clutch in the drive train toward the milling drum, in particular in the direction of power transmission upstream of a traction drive, with which the transmission of different speeds and/or the optional interruption of the drive connection is made possible. To supply the primary drive unit with combustion air, it is also common to use at least one air filter with appropriate combustion air ducting to the primary drive unit.

Thus, generic ground milling machines often comprise an extensive hydraulic system. To supply the individual hydraulic consumers, a hydraulic tank is usually provided on the ground milling machine for storing and collecting hydraulic fluid.

A generic ground milling machine thus comprises extensive components that are required to operate the ground milling machine and must be carried along with it. At the same time, it is desirable to configure such a ground milling machine as compact as possible, on the one hand to be able to fulfill transport regulations more easily and, on the other hand, to be able to offer the operator located on the operator platform comparatively good visibility conditions. With a compact design, good accessibility of one or more of the above-mentioned operating components should ideally be possible at the same time, in the best case from outside the machine.

SUMMARY

Against this background, the object of the invention is to provide a way to accommodate various operating components of the ground milling machine in as compact a manner as possible, while at the same time making individual or several of these components ideally easily accessible for maintenance works.

The object is achieved with a self-propelled ground milling machine, in particular a road cold milling machine, stabilizer or recycler, according to the independent claim. Preferred embodiments are cited in the dependent claims.

The invention relates to a self-propelled ground milling machine, in particular a road cold milling machine, stabilizer or recycler, comprising a milling device for milling the ground at a milling depth, a machine frame supported by front and rear travel units, a primary drive unit arranged on the machine frame, in particular an internal combustion engine, and a hydraulic system with at least two hydraulic pumps, a pump transfer gear and a hydraulic tank. The ground milling machine further has an operator platform from which the self-propelled ground milling machine is operated.

According to the invention, the hydraulic tank is arranged at least partially in vertical extension of the pump transfer gear above the pump transfer gear. In other words, this means that the hydraulic tank is positioned such that, as seen from the pump transfer gear in vertical direction, it overlaps the latter. The advantage of this arrangement is that the hydraulic tank is positioned spatially very close to the hydraulic pumps arranged at the pump transfer gear and thus the hydraulic fluid required to supply the at least two hydraulic pumps is stored in practically immediate proximity to the hydraulic pumps. In this manner, the length of the connecting paths or the hydraulic hoses and/or pipelines required for hosing between the hydraulic tank and the individual hydraulic pumps can be significantly reduced. Preferably, the hydraulic tank is arranged essentially directly above the pump transfer gear, particularly preferably only spatially separated by a part of a mounting frame, as shown in more detail below for a functional unit. Compared to the primary drive unit, the hydraulic tank and also the pump transfer gear regularly have a smaller extension in vertical direction. This makes it possible to arrange the pump transfer gear and the hydraulic tank stacked on top of each other in vertical direction, with the package of pump transfer gear and hydraulic tank then preferably having a maximum vertical extension that is essentially equal to or even smaller than the maximum vertical extension of the primary drive unit, in particular including supply lines.

With regard to the specific arrangement of the hydraulic tank, further preferred arrangement alternatives are possible, in alternative and also in complementary combination with each other. It is advantageous, for example, if the hydraulic tank is arranged completely in front of an engine block of the internal combustion engine in an axial direction of the crankshaft of the internal combustion engine, in particular on its main output side. As a further addition or alternative, the hydraulic tank may extend in the axial direction of the crankshaft above the crankshaft over the, preferably complete, pump transfer gear and/or over a shifting clutch and/or a drive roller of a traction drive. The aforementioned components are usually arranged in a row in the axial direction of the crankshaft and, as a whole, above them may provide an optimum accommodation space for the hydraulic tank in terms of an overall structure as compact as possible. As a further addition or alternative, the hydraulic tank may be arranged at a same level in the axial direction of the crankshaft as at least one air filter, preferably at least two air filters, in particular one air filter on each side of the hydraulic tank. In this case, the two air filters are ideally adjoined by a V-shaped air combiner running toward the internal combustion engine. In this manner, the at least one air filter can be arranged comparatively high up with regard to its intake opening and at the same time relatively close to the primary drive unit in the ground milling machine.

The hydraulic tank is preferably arranged in the axial direction of the crankshaft at the level of several hydraulic pumps, in particular several tandem arrangements of hydraulic pumps. In a tandem arrangement, at least two hydraulic pumps are connected to the pump transfer gear in series in the axial direction on a common connecting flange. The hydraulic tank is preferably configured such that it extends in the axial direction of the crankshaft at least partially, and preferably completely, over at least one, in particular several, and more particularly over all hydraulic pumps flanged to the pump transfer gear.

It may also be advantageous if the hydraulic tank extends in the axial direction of the crankshaft completely above and, with respect to a virtual horizontal projection plane, within an axially sequentially arranged drive train comprising, preferably in this order, a clutch flanged to the internal combustion engine, a pump transfer gear, a shifting clutch and a drive roller of a traction drive. These components may all be configured and arranged with a comparatively low vertical height radially to the axial direction of the crankshaft's rotation axis, so that a sufficiently large and at the same time compact receiving compartment can be obtained for accommodating the hydraulic tank.

Optimized arrangements of the hydraulic tank relative to other components are also possible with regard to the arrangement of individual components in a top view of the rotation axis of the crankshaft. In this context, a V-shaped arrangement in particular has proven to be especially optimal. For this purpose, it can be provided in particular that with respect to the rotation axis of the crankshaft, at least two hydraulic pumps lying opposite one another as seen in the forward direction of the ground milling machine and at least two air filters lying opposite one another are arranged in an essentially V-shaped manner as seen in the axial direction of the crankshaft, wherein in particular in the two V-legs, starting from the base point of the V-shaped arrangement formed by the rotation axis of the crankshaft, in each case one hydraulic pump and in each case one air filter positioned above it in the vertical direction are provided. The two V-legs span a free space between them, which is optimal for accommodating the hydraulic tank, in particular centrally. One outstanding advantage of this specific arrangement is in particular that hydraulic pumps are positioned vertically below the hydraulic tank, horizontally offset on both sides relative to the rotation axis of the crankshaft, thus enabling a comparatively large number of hydraulic pumps and extremely short connection paths from the hydraulic tank to the individual hydraulic pumps. In this plane, the hydraulic tank is thus located directly above and centrally relative to the pumps.

According to a further preferred embodiment of the invention, at least one air filter is arranged in front of and/or behind and/or next to the hydraulic tank in the longitudinal direction of the ground milling machine and/or horizontally and transversely to the rotation axis of the crankshaft, wherein the at least one air filter is positioned in particular in vertical extension of a hydraulic pump arranged on the pump transfer gear. The air filter(s) is/are thus ideally positioned at least partially in the region of the height extension of the hydraulic tank, as seen in the vertical direction. Additionally or alternatively, it is also possible for the hydraulic tank, at least two air filters, the pump transfer gear and at least two hydraulic pumps to be arranged essentially symmetrically with respect to one another, in particular simultaneously in a V-shape, in particular with respect to a mirror plane extending vertically and along the rotation axis of the crankshaft. Additionally or alternatively, at least two hydraulic pumps arranged on the pump transfer gear, at least one air filter positioned next to the hydraulic tank, and the hydraulic tank may be arranged above the rotation axis of the crankshaft with respect to a horizontal reference plane.

The hydraulic tank is preferably mirror-symmetrical with respect to a vertical reference plane running along the rotation axis of the crankshaft. This can facilitate the assembly.

Furthermore, the arrangement concept according to the invention described above enables a variety of preferred embodiments with regard to the manufacture and maintenance of such a ground milling machine according to the invention. For example, this opens up the possibility that a functional unit or a coherent construction module is provided, comprising the hydraulic tank, the pump transfer gear and at least two hydraulic pumps as well as at least one air filter and preferably additionally at least one of the elements "clutch between internal combustion engine and pump transfer gear" and/or "shifting clutch between pump transfer gear and a traction drive roller" and/or "an additional air filter with air ducting toward the internal combustion engine", which is configured as a coherent pre-assembly group that can be moved separately from the internal combustion engine or can be mounted on it coherently, in particular comprising a mounting frame independent of the machine frame. In the present context, and in particular in terms of structure, a functional unit is to be understood such that this overall unit can be removed from the ground milling machine as a whole. The mounting frame describes an inherently rigid support structure that enables the individual components mentioned to be pre-assembled and/or exchanged in a stationary relative position to each other independently of the machine frame.

The functional unit is thus preferably configured such that it can be removed as a whole from the ground milling machine and, in particular, has at least one dedicated connection device for contact or engagement for an external lifting device. Such a lifting device may be, for example, a forklift truck lifting the functional unit or a crane device lifting the functional unit. This can facilitate transport and/or mounting and dismounting of the functional unit on the ground milling machine. It is optimal if, as part of the functional unit, a connection device, for example formed integrally with the mounting frame, is provided at the same time. If this is the case, it may be advantageous if the connection device is positioned on the functional unit and configured such that the functional unit is essentially balanced in contact with the lifting device, in particular both in the state filled with operating fluids and in the empty state with respect to the operating fluids.

The machine frame may have a bearing mount for supporting the combustion engine and/or the functional unit and/or the pump transfer gear. It is then preferred if the machine frame in axial extension of the crankshaft away from the primary drive unit comprises a frame recess, in particular a frame taper, such that the top side of the machine frame is lowered or recessed as far as in the vertical direction below the internal combustion engine and/or the functional unit and/or the pump transfer gear and/or the shifting clutch, in particular a clutch cover or clutch bell of the shifting clutch. This allows the internal combustion engine and/or the other components mentioned above to be positioned comparatively low on the machine frame coming from above in the vertical direction. In this case, the frame recess facilitates assembly and maintenance works, since one or more of the aforementioned components can be moved or removed in the axial direction of the crankshaft across the frame through the frame recess in the axial direction.

It is desirable, however, if the frame recess does not simultaneously create a weak point in the machine frame. To avoid this, the frame recess on the top side of the machine frame may be formed in horizontal extension of the crankshaft in such a way that the machine frame is transitionally reduced downward with an essentially constant cross-sectional profile in this region. In this case, the frame recess is formed as a frame projection on the opposite bottom side of the machine frame. Additionally or alternatively, however, the machine frame in the region of the frame recess, in particular the frame taper, may also be configured such that the bottom side runs horizontally in a straight line at a same level as the region of the machine frame adjoining the frame recess, in particular on both sides, and/or the machine frame has additional stabilization, in particular material thickening, in the region of the frame recess. In this case, the additional material application in the region of the frame recess preferably leads to a transitional increase and decrease in the material thickness of the machine frame in the vertical direction along the longitudinal extension of the machine frame, thereby compensating for structural weakening associated with the recess in this region.

An aspect of the invention independent of, but also combinable with, the foregoing invention is that a generic ground milling machine includes a cooling air ducting having at least one of the features described below in further detail. During the use of such ground milling machines, considerable heating phenomena may occur, for example naturally at the internal combustion engine, in the hydraulic oil circuit, etc. Typically, therefore, ground milling machines include a cooling system with an engine cooling device and a hydraulic fluid cooling device. The engine cooling device may include a first fan and a cooling circuit with an engine heat exchanger. For example, a cooling liquid is circulated in this cooling circuit, via which the internal combustion engine can be cooled during operation. The heat absorbed by the coolant is released into the air at the heat exchanger. The hydraulic fluid cooling device, on the other hand, may be configured to allow cooling of the hydraulic fluid that heats up during operation, again often with the aid of a heat exchanger and a fan associated with it. For cooling, one or more cooling air ducts may be provided, which are configured such that ambient air is drawn in from the external environment by one or more fans and fed to the respective heat exchangers. In this regard, the cooling air may also be drawn through an engine compartment. Based on the above, for a generic ground milling machine, according to the invention at least one suction fan is preferably provided in the rear region of the ground milling machine, which is arranged in such a manner that it blows heated cooling air out of the ground milling machine in a direction obliquely upward and to the rear. With respect to the forward or milling direction, the heated cooling air is thus blown out against the direction of travel in the rear region, specifically against the direction of travel diagonally upward. This has the advantage that no dust from the ground is stirred up by the cooling air flow exiting the ground milling machine. It may be optimal if, especially for this arrangement, an exhaust outlet is arranged downstream of the suction fan, i.e. likewise in the rear region, in such a way that exhaust gases emerging from the exhaust outlet flow directly into the cooling air conveying stream, an outlet opening of the exhaust outlet preferably being arranged in the conveying direction of the cooling air at the level of a fan wheel of the suction fan.

BRIEF DESCRIPTION OF THE DRAWINGS

The invention will be explained in more detail below by reference to the embodiment examples shown in the FIGS.; In the schematic FIGS.:

FIG. 1 is a side view of a ground milling machine of the center rotor type;

FIG. 2 is a schematic top view of individual components of the ground milling machine of FIG. 1;

FIG. 3 is a top view of a drive assembly in the axial direction of the crankshaft; and FIG. 4 is a side view of the drive assembly of FIG. 3.

DETAILED DESCRIPTION

Structurally or functionally like components are designated by like reference numerals in the FIGS., although not every recurring component is designated separately throughout the FIGS.

FIG. 1 shows a ground milling machine 1 of the road cold milling machine type (center rotor type) with an operator platform 2 and a machine frame or chassis 3. The ground milling machine 1 is self-propelled and has travel units 6 for this purpose, for example crawler tracks or wheels. During milling operation, the ground milling machine 1 moves in the working direction a over the ground 7 to be processed. While doing so, the ground milling machine 1 mills the ground 7 at a milling depth with a milling drum 9 of a milling device 20 mounted for rotation about the rotation axis 10 in a milling drum box 8. The milled material removed may, for example, be transferred in working direction a via a conveyor device 5, for example a conveyor belt, to a transport vehicle not shown and transported away by it. Moreover, the ground milling 1 comprises a drive train 13. In order to cool components of this drive train 13, a cooling air supply is provided, among other things, as part of a cooling system, which is configured such that supply air 11 is drawn in at the top side of the ground milling machine 1 at a point of the ground milling machine 1 that is located behind the operator platform 2 in the working direction a. Via exhaust air openings arranged at the rear of the ground milling machine 1, the exhaust air 12 is blown out to the rear in the opposite direction to the working direction a and diagonally upward (for example through corresponding guide vanes in the outlet region).

An exemplary drive train 13 of the ground milling machine 1, in particular for a road cold milling machine, is shown schematically in FIG. 2. It comprises an internal combustion engine 14, for example a diesel engine, as the primary drive unit, the crankshaft of which rotates about the rotation axis D. The crankshaft may be connected to a clutch 15. A pump transfer gear 16 may adjoin the clutch in the axial direction of the rotation axis. Several units 18, such as in particular one or more hydraulic pumps, also in tandem arrangement, of a hydraulic system, may be flanged to distributor shafts of the pump transfer gear 16 and driven by it. The hydraulic system may, for example, be configured such that hydraulic pumps are used to drive hydraulic motors, which are used, for example, to drive the travel units 6 or to drive the conveyor 5 of the ground milling machine 1. Other actuators, such as linear actuators, may also be supplied with hydraulic drive energy via this system, for example, for shield control of the milling device 20, for adjustment of the conveyor device 5, etc. All required hydraulic pumps of the ground milling machine 1 may be coupled to the pump transfer gear 16 and supplied with energy by it. A shifting clutch 19 may adjoin the pump transfer gear 16 in the axial direction of the rotation axis, which in turn is in drive connection with a drive roller 21 of a traction drive 22 driving the milling drum 9. The rotation axis D can be parallel to the rotation axis 10 of the milling drum and thus horizontal and perpendicular to the forward direction a.

Part of the hydraulic system is also a hydraulic tank 23, which, as shown in FIG. 2, is arranged above the pump transfer gear 16 and in the direction of the rotation axis between the internal combustion engine and the traction drive 22. The arrangement may further include two air filters 26 arranged upstream and downstream of the hydraulic tank 23, as viewed in the forward direction a at the level of the hydraulic tank 23. Toward the internal combustion engine, supply lines 27 extend from each of the air filters 26 and, as shown in the top view in FIG. 2, converge at the level of the internal combustion engine to form a common air supply line 33.

FIG. 2 illustrates that the hydraulic tank 23, with respect to its extension in the direction of the rotation axis, extends over the clutch 15, the pump transfer gear 16 and the shifting clutch 19. Further, in a vertical top view, the hydraulic tank overlaps pumps 18, specifically all of the hydraulic pumps 18 connected to the pump transfer gear 16.

FIGS. 3 and 4 show a specific embodiment of the functional components of the drive system of the ground milling machine 1 indicated schematically in FIG. 2. In the top view along the rotation axis D shown in FIG. 3, it can be seen that pumps 18 are arranged above the crankshaft to the right and left with respect to the rotation axis, and an air filter 26 is arranged above each pump. This results in an overall V-shaped arrangement of these components relative to one another, in the present case even symmetrical along a plane of symmetry spanned by the rotation axis D and a vertical line. In the free space between the two V-legs of this arrangement projecting from the rotation axis D, the hydraulic tank 23 is arranged in vertical direction above the pump transfer gear 16 and the shifting clutch 19. The hydraulic tank 23 is essentially free of protrusion in the vertical direction relative to the internal combustion engine 14, including supply lines.

In particular, FIG. 3 illustrates that the hydraulic tank 23 is spatially positioned in close proximity to all pumps 18 arranged on the pump transfer gear 16. In this manner, corresponding line connections between the hydraulic tank 23 and individual pumps can be made very short.

FIG. 4 illustrates that the functional unit 28 consisting of clutch 15, pump transfer gear 16, shifting clutch 19, traction roller 21, hydraulic tank 23 and air filters 26 projects almost flush with the side boundary of the machine frame 3 indicated in FIG. 4 and even partially projects in this direction along the rotation axis beyond the machine frame 3 in the axial direction. This allows optimal access to these components from outside the machine despite the compact overall arrangement.

FIGS. 3 and 4 further illustrate the combination of the clutch 15, the pump transfer gear 16, the shifting clutch 19, the traction roller 21, the pumps 18, the air filters 26, and the hydraulic tank 23 into a coherent functional unit 28, which may be flanged to the primary drive unit, particularly via the clutch 15. This functional unit 28 or this functional module comprises a mounting frame 29 which, in particular in cooperation with the individual components, constitutes a support structure separate from the machine frame 3, which enables pre-assembly of the functional unit 28. Further, in this manner the functional unit 28 can be replaced as a whole on the ground milling machine 1 relatively easily.

Finally, the functional unit 28 comprises lug-shaped connection devices 30, which in the present case may be formed by the mounting frame 29 or, for example, a housing of the pump transfer gear 16.

Finally, FIG. 3 shows a recess 31 in axial extension of the rotation axis D in the machine frame 3. With the aid of the recess 31, the top side of the machine frame 3 is offset downward in the vertical direction V at the level of the clutch 15, the pump transfer gear 16 and/or the shifting clutch 19, as seen in the forward direction a, in such a way that it does not overlap with these components as seen in the axial direction of the rotation axis D. Preferably, in the vertical direction V, the recess 31 is lowered to such an extent that a free space is obtained in the vertical direction between the top side of the machine frame 3 in this region and these components. This likewise facilitates external access to this part of the drive train. In particular, for example, a clutch bell of the shifting clutch 19 can be easily pulled off along the rotation axis D without colliding with the machine frame 3. Since the machine frame 3 thus has a material taper in the vertical direction in this region, additional material thickenings 32 are provided spanning the recess 31 in the longitudinal direction of the machine frame 3. The extent of the material thickenings 32 in this case correlates essentially with the respective extent of the recess 31 over the course of the recess 31 in the longitudinal extension of the machine frame 3, so that overall a constant load-bearing force is ensured across the recess.

What is claimed is:

1. A self-propelled ground milling machine, in particular a road cold milling machine, stabilizer or recycler, comprising:

a milling device to mill a ground at a milling depth;

a machine frame supported by front and rear travel units;

a primary drive unit arranged on the machine frame, the primary drive unit comprising an internal combustion engine;

a hydraulic system having at least two hydraulic pumps, a pump transfer gear and a hydraulic tank; and an operator platform, wherein the hydraulic tank is arranged at least partially in vertical extension of the pump transfer gear above the pump transfer gear.

2. The self-propelled ground milling machine according to claim 1, wherein, with respect to a rotation axis of a crankshaft of the internal combustion engine, the at least two hydraulic pumps lying opposite one another and at least two air filters lying opposite one another are arranged in an essentially V-shaped arrangement as seen in an axial direction of the crankshaft, wherein in two V-legs of the V-shaped arrangement, starting from a base point of the V-shaped arrangement formed by the rotation axis of the crankshaft, in each case one of the at least two air filters is positioned above in a vertical direction above one of the at least two hydraulic pumps, wherein the hydraulic tank is arranged between the two V-legs.

3. The self-propelled ground milling machine according to claim 1, wherein the hydraulic tank is minor-symmetrical with respect to a vertical reference plane running along a rotation axis of a crankshaft of the internal combustion engine.

4. The self-propelled ground milling machine according to claim 1, further comprising a functional unit comprising the hydraulic tank, the pump transfer gear and the at least two hydraulic pumps is configured as a coherent pre-assembly group comprising a mounting frame independent of the machine frame.

5. The self-propelled ground milling machine according to claim 4, wherein the functional unit is removable as a whole from the ground milling machine and has at least one connection device to connect or engage with an external lifting device.

6. The self-propelled ground milling machine according to claim 5, wherein the connection device is positioned on the functional unit such that the functional unit is essentially balanced with the lifting device.

7. The self-propelled ground milling machine according to claim 4, wherein the functional unit further comprises at least one of an air filter, a clutch between the internal combustion engine and the pump transfer gear and a shifting clutch between the pump transfer gear and a traction roller.

8. The self-propelled ground milling machine according to claim 1, wherein the machine frame has a bearing mount to support at least one of the internal combustion engine and the pump transfer gear, and a frame recess in an axial extension direction of a crankshaft of the internal combustion engine away from the internal combustion engine such that a top side of the machine frame is lower in a vertical direction below at least one of the internal combustion engine, the pump transfer gear and a shifting clutch.

9. The self-propelled ground milling machine according to claim 1, wherein the machine frame includes, in a region of a frame recess, a bottom side that runs horizontally in a straight line at a same level as a region of the machine frame adjoining the frame recess.

10. The self-propelled ground milling machine according to claim 1, further comprising a cooling air ducting having at least one suction fan in a rear region of the ground milling machine, which is arranged such that the fan blows heated cooling air out of the ground milling machine in a direction obliquely upward and to a rear of the ground milling machine.

11. The self-propelled ground milling machine according to claim 1, wherein the hydraulic tank is arranged completely in front of an engine block of the internal combustion engine in an axial direction of a crankshaft of the internal combustion engine.

12. The self-propelled ground milling machine according to claim 1, wherein the hydraulic tank extends in an axial direction of a crankshaft of the internal combustion engine above the crankshaft over the pump transfer gear and at least one of a shifting clutch and a drive roller of a traction drive.

13. The self-propelled ground milling machine according to claim 1, wherein the hydraulic tank is arranged in an axial direction of a crankshaft of the internal combustion engine at a same level as at least one air filter.

14. The self-propelled ground milling machine according to claim 1, wherein the hydraulic tank is arranged in an axial direction of a crankshaft of the internal combustion engine at a level of the at least two hydraulic pumps.

15. The self-propelled ground milling machine according to claim 1, wherein the hydraulic tank extends in an axial direction of a crankshaft of the internal combustion engine entirely within a drive train arranged sequentially in the axial direction and comprising a clutch flanged to the internal combustion engine, the pump transfer gear, a shifting clutch, and a drive roller of a traction drive.

16. The self-propelled ground milling machine according to claim 1, wherein at least one air filter is arranged at least one of being in front of, behind and next to the hydraulic tank in a longitudinal direction of the ground milling machine and/or horizontally and transversely to a rotation axis of a crankshaft of the internal combustion engine.

17. The self-propelled ground milling machine according to claim 1, wherein the hydraulic tank, at least two air filters, the pump transfer gear and the at least two hydraulic pumps are arranged essentially symmetrically with respect to one another, with respect to a minor plane extending vertically and along a rotation axis of a crankshaft of the internal combustion engine.

18. The self-propelled ground milling machine according to claim 1, wherein the at least two hydraulic pumps are arranged on the pump transfer gear, at least one air filter is positioned next to the hydraulic tank, and the hydraulic tank is arranged above a rotation axis of a crankshaft of the internal combustion engine with respect to a horizontal reference plane.

19. The self-propelled ground milling machine according to claim 1, wherein the machine frame includes, in a region of a frame recess, additional stabilization in a form of material thickening in the region of the frame recess.

20. The self-propelled ground milling machine according to claim 1, further comprising a cooling air ducting having an exhaust gas outlet arranged downstream of a suction fan in a blowing direction such that exhaust gases exiting the exhaust gas outlet are conveyed directly into a cooling air conveying stream.

* * * * *